Patented Mar. 18, 1930

1,751,163

UNITED STATES PATENT OFFICE

ARTHUR LOESSIN, OF BERLIN-CHARLOTTENBURG, GERMANY

METHOD OF MANUFACTURING CERAMIC MATERIALS, BUILDING ELEMENTS, AND THE LIKE, FROM MUD

No Drawing. Application filed September 20, 1926, Serial No. 136,734, and in Germany October 1, 1925.

My invention relates to a method of manufacturing ceramic materials, building elements and the like, from mud. It is an object of my invention to eliminate certain drawbacks involved in the old methods of this kind.

To this end, I add to the mud substances which are adapted to counteract the detrimental influence of impurities or constituents of normal mud which heretofore made it unsuitable for the manufacture of ceramic materials.

Mud is found in huge quantities on the sea shore, particularly in the estuaries of rivers, and it has already been proposed to use this cheap and abundant material for the manufacture of building elements and other ceramic materials or articles but the attempts failed on account of the presence of the said detrimental impurities or constituents the influence of which is not eliminated by the usual treatment of clay from which ceramic materials and the like are to be made.

In performing my method, I separate from the mud about one-half of its percentage of water, knead it in the presence of a salt, for instance, shelf or Glauber's salt, which is added for eliminating the detrimental influence of the said impurities or constituents, and sand, which may be added for increasing the hardness and weatherproofness of the finished product but is dispensed with where these properties are not required, mould the mixture, if required, subject it to preliminary burning at about 400 to 450 deg. centigrade, allow it to cool, and finish-burn it at a suitable temperature, say, 980 deg. centigrade.

While the salt is added in any case, the presence of sand in the mixture is determined by the properties of the finished product.

If weatherproofness is not a factor, as in the case of bricks for rear or facing walls, the sand may be dispensed with altogether but it is indispensable for weatherproof articles. For products which combine weatherproofness with hardness, such as clinkers, the mixture—to which sand has been added—is burned in three stages, two preliminary ones at about 400 to 450 deg. centigrade with intermediate cooling, and a final stage at normal finish-burning temperature.

By increasing the finish-burning temperature beyond its normal value products other than those mentioned may be obtained the properties of which are a function of the temperature, as will be described below.

My invention is, by way of example, performed as follows:

Mud from the dredger, with about 90 per cent of water, is allowed to settle in tanks for about four months whereupon the water is decanted, leaving the mud as a kneadable substance of about 45 per cent of water. Instead of settling and decanting, the mud may be partly dried by centrifugal action.

This mud, with about one-half of its normal percentage of water, is then thoroughly kneaded in kneaders of any suitable type in the presence of shelf or Glauber's salt, to the amount of about two or three per cent of weight. The object of the salt is, as mentioned, to counteract the detrimental influence of the bitumen oils in the mud, and it also increases the hardness of the finished articles. Without the salt the bitumen oils would cause the bricks to crack during burning and render them unsuitable for further treatment.

If hardness is a factor, quartz sand is added to the mixture but where hardness is not required as in the case of rear walls or other articles where the material is not exposed to the weather, sand, as mentioned, may be dispensed with.

After kneading, the mixture in which the constituents have now been thoroughly distributed, is ready for moulding by hand or by any suitable moulding machine.

Bricks from a mixture without sand are then burned for one day at 400 to 450 deg. centigrade, allowed to cool and then finish-burned at normal temperature, viz, about 980 deg. centigrade. In this manner, good-class bricks for rear and facing walls and other articles without weatherproof qualities and without particular hardness are obtained.

For making weatherproof and hard articles, for instance, clinkers, 10 to 20 per cent of quartz sand are added to the mixture of mud and salt (Glauber's salt) and the sand combines with the clays in the mud upon burning. The bricks are then burned at 400 to 450 deg. centigrade, allowed to cool, burned again at the same temperature, allowed to cool again, and finish-burned at about 980 deg. centigrade. The clinkers thus obtained are perfectly weatherproof.

Without the one or two preliminary burning stage, or stages, suitable bricks or other articles cannot be obtained.

To obtain an excellent paving material the mixture is treated as described above and subjected to one preliminary burning operation whereupon it is heated for about one day at about 1300 deg. centigrade, the mud will melt and a black, blow-holed slag of about 7 to 8 hardness will be obtained from which paving stones may be moulded.

The product of this process may also be ground and will then yield a white powder which is excellent for enamelling iron vessels.

When heated at a still higher temperature, say 1350 to 1400 deg. centigrade, and maintained at this temperature for about two days, a deep black and thin-flowing product without blow holes is obtained which is very suitable for castings of any kind.

Throughout this specification and the appended claims, by the term "mud" I mean to include only that material which is normally carried by the flowing water but eventually sinks to the bottom of the flowing stream. Mud is material which is deposited in great quantities in the blackish water at the shore of the ocean and the word has a definite meaning. Mud is not to be confused with clay and also is not to be confused with slime, such as river slime.

I claim:

1. The method of manufacturing ceramic materials and articles from mud, comprising mixing the mud with a substance adapted to counteract the detrimental influence of impurities in, or constituents of, the mud and with sand, subjecting the mixture to two preliminary burning stages with intermediate cooling, and finish-burning it.

2. The method of manufacturing ceramic materials and articles from mud comprising mixing the mud with a substance adapted to counteract the detrimental influence of impurities in, or constituents of, the mud, subjecting the mixture to preliminary burning, and finish-burning it.

3. The method of manufacturing ceramic materials and articles from mud, comprising removing about one-half of its percentage of water from the mud, kneading the mud in the presence of a substance adapted to counteract the detrimental influence of impurities in, or constituents of, the mud, moulding the mixture, subjecting it to preliminary burning, allowing it to cool, and finish-burning it.

4. The method of manufacturing ceramic materials and articles from mud comprising removing about one-half of its percentage of water from the mud, kneading the mud in the presence of a substance adapted to counteract the detrimental influence of impurities in, or constituents of, the mud, and of sand, moulding the mixture, subjecting it to preliminary burning, allowing it to cool, and finish-burning it.

5. The method of manufacturing ceramic products from mud which comprises removing about half the natural water content of the mud, mixing the mud with Glauber's salt, moulding the resulting mixture, subjecting the moulded mixture to a preliminary burning at 400 to 450° C., cooling the burnt mixture and finally reburning it at a substantially higher temperature.

6. The method as in claim 5 in which the reburning temperature is about 1300° C.

In testimony whereof I have signed my name to this specification.

ARTHUR LOESSIN.